United States Patent [19]
Yoshihara

[11] Patent Number: 5,931,183
[45] Date of Patent: Aug. 3, 1999

[54] LIQUID CUTOFF VALVE UNIT

[75] Inventor: Koichi Yoshihara, Fujisawa, Japan

[73] Assignee: NOK Corporation, Tokyo, Japan

[21] Appl. No.: 09/050,979

[22] Filed: Mar. 31, 1998

[30] Foreign Application Priority Data

Mar. 31, 1997 [JP] Japan .................................. 9-094350

[51] Int. Cl.⁶ ................................................. F16K 24/04
[52] U.S. Cl. ............................................. 137/202; 137/43
[58] Field of Search ...................................... 137/43, 202

[56] References Cited

U.S. PATENT DOCUMENTS

| | | | |
|---|---|---|---|
| 5,518,018 | 5/1996 | Roetker | 137/43 |
| 5,566,705 | 10/1996 | Harris | 137/43 |
| 5,762,090 | 6/1998 | Halamish et al. | 137/202 X |

FOREIGN PATENT DOCUMENTS 2-34761 3/1990 Japan .

*Primary Examiner*—Gerald A. Michalsky
*Attorney, Agent, or Firm*—Jacobson, Price, Holman & Stern, PLLC

[57] ABSTRACT

A liquid cutoff valve unit provided for a sealed container in which a liquid fills comprises a discharge passage formed to an upper portion of the sealed container in a used state and adapted to discharge the gas therein, a float valve moving in accordance with a buoyancy so as to open or close the discharge passage, a float chamber in which the float valve is accommodated and having a size enabling the float valve to be moved therein and an urging means such as spring for urging the float valve in a valve closing direction. The float valve is provided with a cylindrical member having an upper end closed and a lower end opened to provide an inner cylindrical space formed as an air reservoir and at least one communication port opened to a side wall section of the cylindrical member and adapted to establish communication between an inside and an outside of the air reservoir. The float chamber is provided with at least one opened window section formed to a side wall section thereof at a position corresponding to the communication port of the float chamber so that a gas in the sealed container finely pass through the opened window section.

3 Claims, 7 Drawing Sheets

LIQUID CUTOFF VALVE UNIT

BACKGROUND OF THE INVENTION

The present invention relates to a liquid cutoff valve unit provided for a fuel tank of, for example, a vehicle, capable of discharging gas such as fuel steam from a discharge passage connected to the cutoff valve unit and preventing liquid such as fuel from leaking outside the discharge passage.

FIG. 7 shows one conventional liquid cutoff valve unit of the kind mentioned above, which is provided for a fuel tank of a vehicle.

Referring to FIG. 7, a liquid cutoff valve unit 102 is mounted to an upper portion of a fuel tank 101 and adapted to flow air and fuel steam G101 in the fuel tank 101 into a canister 104 through a discharge line 103 to thereby liquify the fuel steam G101 and feed it to an intake side of an engine, not shown for preventing the generated fuel steam G101 from causing a counterflow thereof and discharging through an fuel supply port.

The liquid cutoff valve unit 102 is also provided with a function for preventing a fuel L101 from leaking through the discharge line 103 at a time when a liquid level of the fuel L101 in the tank 101 rises when the fuel is supplied or a vehicle body is oscillated or when a vehicle is tilted or rolled.

FIGS. 8A and 8B are sectional views of the cutoff valve unit 102 of FIG. 7 for the explanation of the structure and functions thereof, in which FIG. 8A shows a normal (used) state that the cutoff valve unit 102 does not attain a liquid cutoff function and the fuel steam G101 can be discharged and FIG. 8B shows a state that the liquid cutoff valve unit is closed when a liquid level of the fuel L101 rises, and attains the liquid cutoff function.

In FIGS. 8A and 8B, a float chamber 110a, in which a float 111 is accommodated, is formed in a case member 110. The float 111 floats by a buoyancy (floating force) caused by a force of the fuel L101 flowing into the inside of the float chamber 110a through a communication port 112a formed to a cap 112 mounted to an lower end portion of the case member 110 and then rises upward in the illustrated state.

A valve body 111a in form of annular seal performing a sealing function is disposed to an upper portion of the float 111 and a valve seat 111b corresponding to the valve body 111a is disposed to an upper portion of the float chamber 110a. The float 111 has an approximately cylindrical structure having an upper sealed end (on the side to which the valve body 111a is mounted), and the inner cylindrical portion is formed as an air reservoir 111b to thereby obtain the buoyancy. The valve body 111a and the valve seat 110b constitutes, in combination, a float valve 105. Reference numeral 113 denotes a spring as an urging means for adjusting the buoyancy of the float 111 and the spring 113 always urges the float 111 with a urging force smaller than the self-weight of the float 111 in such a manner that the float is not moved upward and the float valve 105 is not closed at a normally standing attitude as far as any buoyancy is not applied.

The valve seat 119b is formed as one end portion of a cylindrical vent member 110c, which has another one end portion formed as a valve seat portion 110d connected to the discharge line 103 through a diaphragm valve 120 abutting against the valve seat portion 110d. The diaphragm valve 120 is opened by a pressure difference between the inner pressure of the diaphragm valve 120 and the inner pressure of the fuel tank 101, and in order to introduce a pressure corresponding to an atmospheric pressure (or negative pressure), a filler port 106 is provided for a working chamber R101 and the filler port 106 is connected to a filler tube (fuel supply portion) 107 through a filler line 108 as shown in FIG. 7.

In a state that the pressure difference between the inside of the fuel tank 101 and the working chamber R101 is small, the valve seat portion 101b is closed because of the urging force of the spring 121 in the valve closing direction and the valve seat portion 101b is opened at a time when a pressure more than a predetermined pressure difference, for example, at a time of fuel supply, is created, the diaphragm valve 120 is opened to thereby flow out the fuel steam G101 into the discharge line 103.

The diaphragm valve 120 is further provided with an orifice 122 for achieving fine (minute) communication between the working chamber R101 and the inside of the fuel tank and the working chamber R101 so as to discharge the fuel L101, by a little amount, flowing into the working chamber R101, into the fuel tank 101.

In the structure mentioned above, the reason why the working chamber R101 does not take a position released for introducing the atmosphere and takes a position sealed through the connection to the filler tube 107 resides in that the fuel steam G101 passing through the orifice 122 and pressure films of the diaphragm valve 120 can be prevented from being directly discharged into the atmosphere. Such a case as that the fuel steam G101 passes through the pressure film will occurs in a case where the pressure film is formed of a thin film made of a rubber elastic material. Further, the fuel supply port formed to the opened end of the filler tube 107 is generally closed by a cap and the fuel cannot be discharged outward therethrough by the venturi effect of the fuel L101.

Accordingly, in the state of FIG. 8A, the float 111 is positioned downward without receiving any buoyancy of the fuel L101, and when the inner pressure of the fuel tank 101 is increased at a time of, for example, fuel supply, the fuel steam G101 passes the communication port 110e opened to the upper portion of the float chamber 110a and flows into the vent portion 110c through the valve body 111a and the valve seat 110b which are now opened. The fuel steam G101 is then flowed towards the discharge line 103 through the diaphragm valve 120 which has been opened by the pressure difference caused at this time.

On the other hand, in the state of FIG. 8B, the liquid, i.e. fuel, level is increased upward by, for example, fuel supply and the fuel L101 is then flowed into the float chamber 110a. In this instance, the float 111 is moved upward and the float valve 105 is closed to thereby cutoff the communication with the discharge line 103.

Under the state mentioned above, the fuel steam G101 in the fuel tank 101 is also not discharged, and when the fuel is further supplied, the liquid level in the filler tube 107 is increased and the operation of, for example, an fuel supply gun is automatically stopped, thus stopping the fuel supply. When the liquid level L101a in the fuel L101 in the float chamber 101 downs, the float 111 is also moved downward to thereby open the float valve 105 in the state such as shown in FIG. 8A.

In the conventional structure of the liquid cutoff valve unit 102 mentioned above, the buoyancy of the float 111 largely depends on an air reservoir 111b formed inside the float 111. Accordingly, in the state of the fuel tank 101 which has normal standing attitude, the air and the fuel steam G101 are not flowed out from the air reservoir 111b and the buoyancy is hence not largely lowered. However, in a case where a vehicle is largely tilted or rolled over, the air and fuel steam G101 in the air reservoir 111b are flowed out and, hence, the buoyancy of the float 111 will be changed.

FIG. 9 includes views for explaining a roll-over test executed for confirming and evaluating the fact whether the liquid cutoff valve unit 102 can maintain its normal functions even if the buoyancy of the float 111 varies.

In the roll-over test, it is necessary to confirm and evaluate the functions of the liquid cutoff valve unit 102 at the roll-over time of the vehicle with respect to the filling condition of the fuel L101 from approximately fuel empty state to approximately fuel fill-up state in the fuel tank 101. For example, test are performed with respect to the fuel amount in the fuel tank 101 by gradually changing the fuel to the amount of ¼ (approximately empty state), ½, ¾ and ¼ (approximately fill-up state), and the respective views of FIG. 9 represent the roll-over tests performed at the time of the fuel fill-up state in the tank 101.

More in detail, FIG. 9A shows a test starting state in which the fuel tank 101 is in a normal standing attitude and the liquid level L101a gives buoyancy to the float 111, which is hence moved upward to thereby close the float valve 105.

FIG. 9B shows a state in which the fuel tank 101 is rotated rightward, as viewed, by 90° about the inner central portion of volume C1 thereof as the rotational axis. In this step, a change of time from the state of FIG. 9A to that of FIG. 9B constitutes one condition for the test, and in this example, it is assumed that it takes three minutes. The state of FIG. 9B is maintained for five minutes.

In a manner similar to that mentioned above, the fuel tank 101 is rolled succeedingly by 90° from the state shown in FIG. 9B to the state shown in FIG. 9C, then from the state shown in FIG. 9C to the state shown in FIG. 9D, and finally, to the state shown in FIG. 9E, which is the same standing state as that shown in FIG. 9A after one rotation of the fuel tank 101. This rotation cycle is repeated by several times in the same direction or reverse direction, and thereafter, fuel leaking amount during such rotation cycles of the fuel tank 101 is measured. According to this manner, the function of the liquid cutoff valve unit 102 is examined and evaluated.

However, in the structure of the float 111 in which the air (including the fuel steam G101) existing in the air reservoir 111b, there may cause a case where the air in the air reservoir 111b is vented (breathed) and, in such case, when the fuel tank 101 is turned from the state shown in FIG. 9A to the states shown in FIGS. 9B and 9C during the first one rotation cycle, the air does not substantially exist in the air reservoir 111b in the state shown in FIG. 9E. In this state, the buoyancy of the float 111 is reduced and the float valve 105 easily takes a valve opened state. From this state, the fuel tank 101 is further rotated, there may cause a case where much fuel leaking through the opened float valve 105 during the rotating process from the state shown in FIG. 9A to the state shown in FIG. 9B is observed and measured by the roll-over tests.

In further conventional art, there has been provided, as a countermeasure to such problem, a liquid cutoff valve unit 202 shown in FIG. 10 having a structure in which the float 111 is formed, at its upper end portion, with a predetermined number of fine communication ports 203, each having a small diameter, for venting the air from the air reservoir 111b for reducing the buoyancy caused by the air in the air reservoir 111b, and the reduced buoyancy is adjusted by increasing a spring constant of the spring 113. The other structural elements of the liquid cutoff valve unit 202 of FIG. 10 other than the above structure are substantially the same as those of the cutoff valve unit 102, the descriptions thereof are omitted herein by adding the same reference numerals in FIG. 10.

According to this structure, however, the valve opened degree, i.e. position, of the float valve 105 is changed in response to the fuel supply speed, and much difference will be caused in the fuel fill-up amount at the fuel supply time. That is, in a case where the fuel supply is performed slowly to gradually increase the liquid level L101a in the fuel tank 101, the air in the air reservoir 111b is discharged through the communication port 203 in accordance with the increasing, i.e. rising, of the liquid level L101a and, hence, when the liquid level reaches a relatively high position, the float valve 105 is closed as shown in the state of FIG. 11A. On the other hand, in a case where the liquid level L101a is rapidly increased, the air in the air reservoir 111b to be discharged through the communication port 203 is temporarily stored therein because the air discharging does not follow up to the rapid increasing of the liquid level L101a, and this stored air acts to the float 111 as buoyancy. A large amount of air, including the fuel steam G101, is discharged through the valve seat portion 110b, which results in the pressure lowering by which a sucking force is applied to the float 111 to easily open the same. Accordingly, in such case, the float valve 105 may be closed at the lower liquid level in the fuel tank 101 as shown in the state of FIG. 11B.

Thus, as mentioned above, when the fuel is rapidly supplied, the float valve 105 is closed faster in time, corresponding to the difference D1 in the liquid surface levels L101a between the states of FIGS. 11a and 11B. Therefore, the float valve 105 is closed at different liquid level in the fuel tank 101 in response to the difference fuel supply speeds, resulting in the difference of the fuel fill-up amount in the tank 101.

SUMMARY OF THE INVENTION

An object of the present invention is to substantially eliminate defects or drawbacks encountered in the prior art described above and to provide a liquid cutoff valve unit capable of maintaining stable valve closing characteristics and preventing a fuel from leaking even in a roll-over time of a vehicle, for example, and also capable of performing a stable operation such as a reducing fuel fill up amount variation even in a time of different fuel supply speed and amount being irregularly changed.

This and other objects can be achieved according to the present invention by providing a liquid cutoff valve unit provided for a sealed container in which a liquid fills, comprising:

a discharge passage formed to an upper portion of the sealed container in a used state and adapted to discharge the gas therein;

a float valve moving in accordance with a buoyancy so as to open or close the discharge passage;

a float chamber in which the float valve is accommodated and having a size enabling the float valve to be moved therein; and a spring member for urging the float valve in a valve closing direction, the float valve being provided with a cylindrical member having an upper end closed and a lower end opened to provide an inner cylindrical space formed as an air reservoir and at least one communication port opened to an upper side wall of the cylindrical member and, adapted to establish communication between an inside and an outside of the air reservoir, and the float chamber being provided with at least one opened window section formed to a side wall section thereof at a position corresponding to the communication port of the float chamber so that a gas in the sealed container finely pass through the opened window section.

In preferred embodiment in this aspect, the communication port of the float valve is located at a position lower than the location of the opened window section at a time when the float valve takes a lower position and no buoyancy acts thereon and, when the buoyancy acts thereon and the float valve is raised, the communication port takes a position corresponding to the location of the opened window section.

The communication port has a width substantially equal to that of the opened window section. A plurality of communication ports are formed and a plurality of opened window sections are formed so as to correspond to the communication ports in numbers and positions.

According to the structures described above, in a state where the liquid in the sealed container has a low liquid level, the float valve is in the open-valve state and the gas in the sealed container is enabled to be discharged into the discharge passage through the opened window section formed to the side wall section of the float chamber. In accordance with the increasing of the liquid level of the liquid supplied in the sealed container, the buoyancy acts on the cylindrical member of the float valve to thereby close the discharge passage.

In the above operation, in the case of the low liquid supply speed (low liquid level rising speed), the gas existing in the air reservoir is gradually breathed through the communication port, so that the buoyancy due to the gas in the air reservoir does not act on the float valve and, hence, the float valve is moved in the valve closing direction by the buoyancy of the cylindrical member itself and the urging force of the urging member, thus the discharge passage having been closed.

Further, in the above operation, in the case of the high liquid supply speed (high liquid level rising speed), a lot of gas may be generated and the liquid surface may be waved, resulting in that the amount of the gas existing in or introduced into the air reservoir exceeds the amount of the gas vented through the communication port. Accordingly, the buoyancy is applied to the float valve and, hence, the float valve is closed at the liquid level lower than that for closing the float valve at the low liquid supply speed.

However, in the state where the float valve is opened at the high liquid supply speed, the gas in the air reservoir is sucked and discharged, by the negative pressure phenomenon, through the communication port by the velocity of the gas flowing from the opened window section into the discharge passage through the float chamber, so that the buoyancy due to the gas in the air reservoir is lowered and the float valve is hard to be closed. As a result, the liquid level for closing the float valve rises to a liquid level for closing the float valve at the low liquid supply speed.

The inner spaces of the air reservoir and the sealed container are communicated through the opposing communication port and opened window section and the gas flows minutely smoothly therebetween, whereby the liquid level in the air reservoir properly changes in accordance with the waved condition of the liquid level, and the increasing or decreasing of the buoyancy due to the air existing in the air reservoir can be significantly reduced and the stable operation of the float valve can be achieved.

According to another structure of the present invention mentioned above, in the state where the float valve is positioned at a lower level, the air in the sealed container does not flow into the communication port through the opened window section formed to the float chamber and is introduced to the discharge passage, so that the lowering of the discharge amount of the gas can be prevented. When the liquid level is increased and the float valve is moved upward to a position where the communication port opposes to the opened window section, the float valve is closed by the negative pressure mentioned above and the stability of the float valve against the waved liquid surface can be ensured.

The nature and further characteristic features of the present invention will be made more clear from the following description made with reference to the accompanying drawings.

DESCRIPTION OF THE PREFERRED EMBODIMENTS

The present invention will be described hereunder with reference to the accompanying drawings.

First Embodiment

Figure 1A:
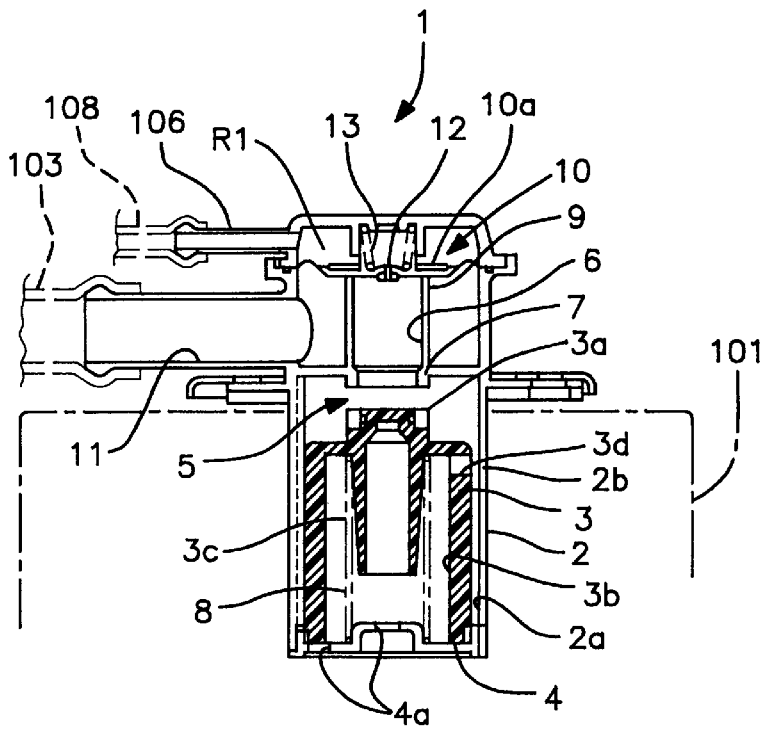
FIG. 1A is a sectional view of a liquid cutoff valve unit according to a first embodiment of the present invention and FIG. 1B is a front view of a float of the liquid cutoff valve unit of FIG. 1A.
Figure 1B:
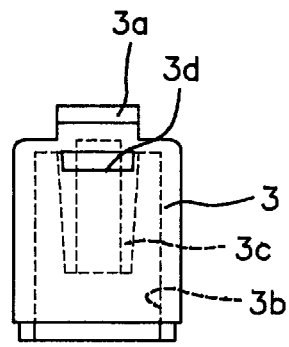

FIGS. 1A and 1B show a first embodiment of the liquid cutoff valve unit 1 according to the present invention, and the liquid cutoff valve unit 1 is a valve, as mentioned in the background of the invention herein, to be mounted to an upper portion of, for example, a fuel tank 101 of a vehicle, as a sealed container. Fuel steam G (air) and the like gas is discharged to a discharge line 103 connected to the liquid cutoff valve unit 1 by means of a float valve which is usually opened at a normal standing attitude, but a liquid such as fuel L is not prevented from leaking into the discharge line 103, even at a time when the fuel is supplied or a vehicle is tilted or rolled over, by closing the float valve.

More in detail, with reference to FIG. 1A, the liquid cutoff valve unit 1 is provided with a housing 2 thereof having an inside float chamber 2a in which a float 3 is accommodated. The float 3 is moved upward, as viewed in FIG. 1A, by a buoyancy by means of the fuel L flowed into the float chamber 2a through a communication port 4a formed to a cap 4 mounted on the lower side of the housing 2.

A valve body 3a is provided for an upper end portion of the float 3 so as to project upward and a valve seat 7 constituting one end portion of a cylindrical vent portion 6 constituting a portion of a discharge passage is disposed at an upper portion, corresponding to the valve body 3a, of the float chamber 2a. Thus, a float valve 5 is composed of the float 3, the valve body 3a and the valve seat 7.

The float 3 is composed of a cylindrical member having an upper end portion (a side to which the valve body 3a is provided) which is sealed and a lower end portion which is opened. An inner cylindrical space of the float 3 is formed as an air reservoir 3b, and at the central portion thereof, a cylindrical spring guide 3c is formed towards the opened lower end side thereof.

The float 3 has an upper side wall portion to which a communication port 3d communicating the air reservoir 3b and an outside of the float 3 (float chamber 2a) is formed. An opened window section 2b, through which a fuel steam G can pass slightly, is formed to a portion of the housing 2 corresponding to the communication port 3d.

FIG. 1B is a view showing the float 3 taken out from the float chamber 2a with the communication port 3d disposed on the front side. In this embodiment, the communication port 3d is formed with its width having a length about ⅙ of the circumferential length in the circumferential direction thereof and its height having a length about ¼ of the width. The present embodiment may be provided with a plurality of communication ports 3d to proper portions in the circumferential direction of the float 3, and for example, two communication ports 3d may be formed to opposing portions in the circumferential direction of the float 3 or three communication ports 3d may be formed at portions in the circumferential direction thereof with equal interval.

The opened window section 2b has a bilateral width approximately equal to that of the communication port 3d and a height about two times of that thereof for ensuring an area to discharge the fuel steam G even if the float 3 is moved by the buoyancy. A plurality of opened window sections 2b may be provided in correspondence to the plurality of the communication ports 3d in numbers or positions, and this is an optional design matter made as occasion demands. In this embodiment, the lower edge portion of the communication port 3d and that of the opened window section 2b are positioned to portions substantially equal to each other in height in a location that the float 3 is positioned at its downward position.

Accordingly, when the liquid level of the fuel L rises, the gas (air and fuel steam G, which may be called hereunder simply as air) existing in the air reservoir 3b in the inner cylindrical portion is vented, so that any buoyancy due to the air is not applied to the float 3, and therefore, the float 3 floats by a buoyancy due to the self-weight thereof and the urging force of a spring 8 to thereby close the float valve 5.

As mentioned above, the spring 8 is disposed as urging means for adjusting the buoyancy of the float 3, and the spring 8 always urges the float 3 with a urging force smaller than the self-weight of the float 3. However, in the normal (standing) attitude of the float 3, the spring 8 does not push up the float 3 and not open the float valve 5 as far as any buoyancy is not applied.

The vent portion 6 has the other end portion formed as a valve seat 9 which is operatively connected to the discharge line 103 through a diaphragm valve 10, abutting against the valve seat 9, and a discharge port 11.

Figure 7:
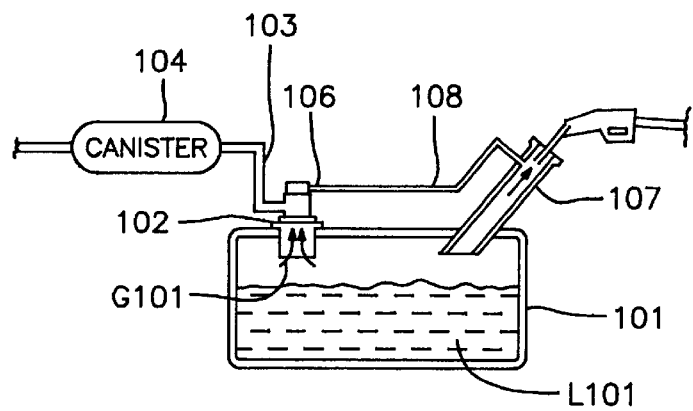
FIG. 7 is a view showing a utilization of a conventional liquid cutoff valve unit.
Figure 8A:
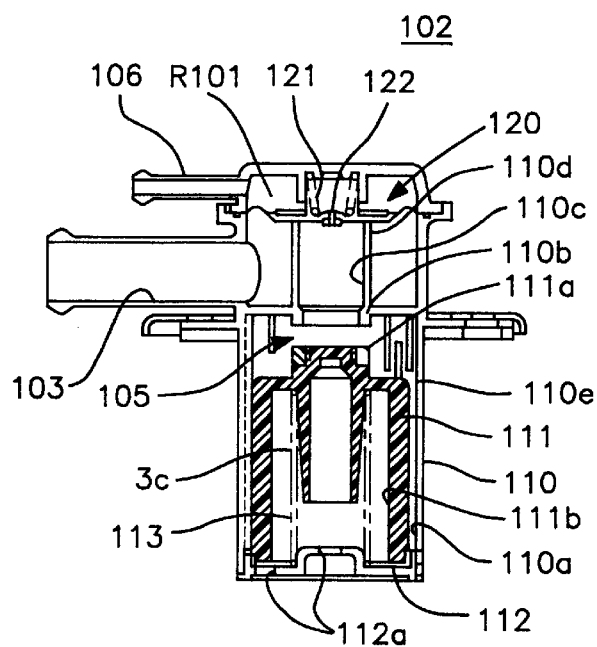
FIGS. 8A and 8B are sectional views of a liquid cutoff valve unit having a conventional structure.
Figure 8B:
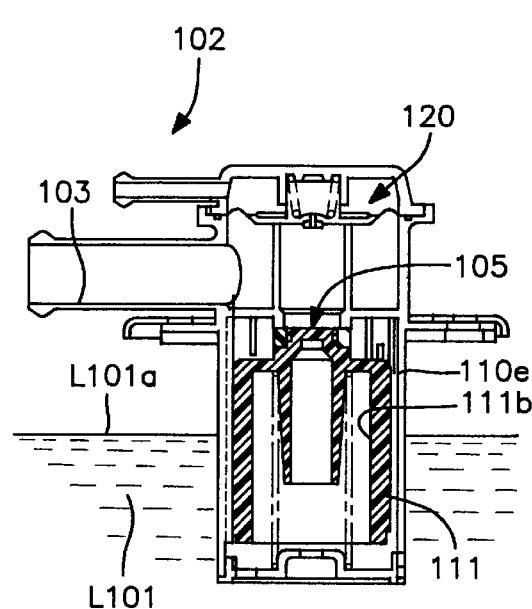
Figure 9A:
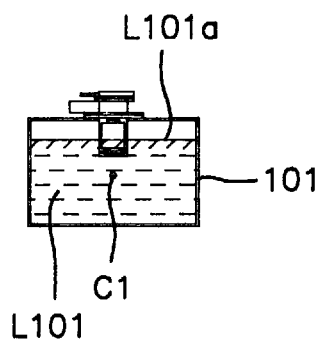
FIGS. 9A–9E are views explaining a roll-over test.
Figure 9B:
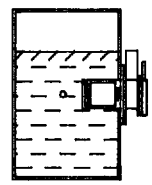
Figure 9C:
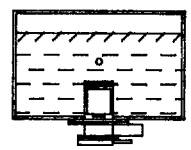
Figure 9D:
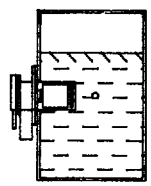
Figure 9E:
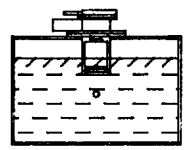
Figure 10:
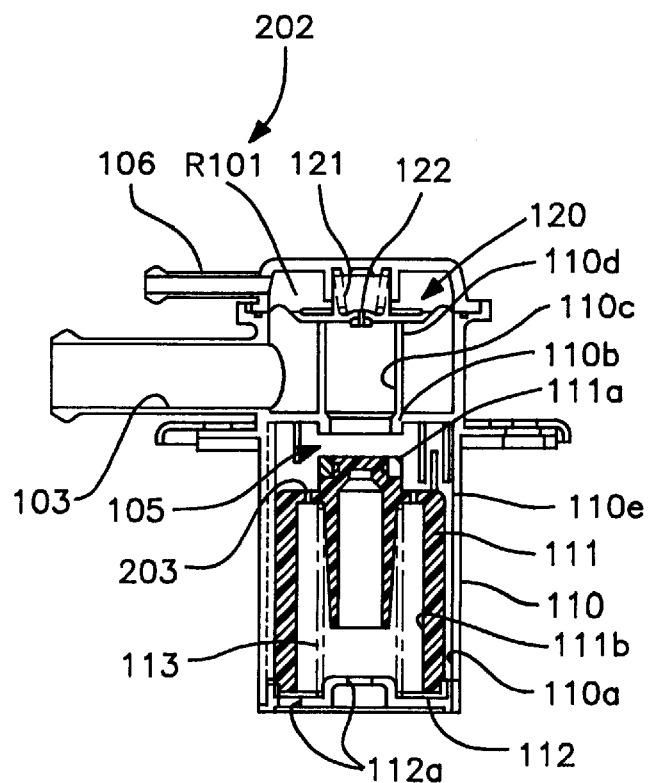
FIG. 10 is sectional view of a conventional structure in which a communication port is formed to an upper portion of a float.
Figure 11A:
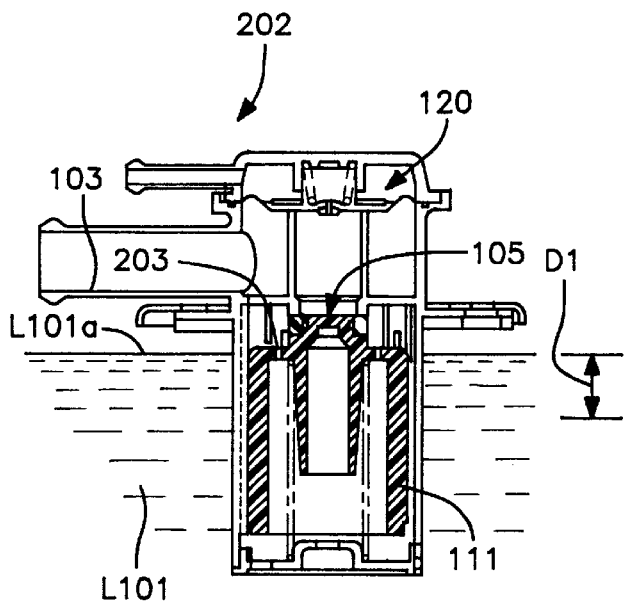
FIGS. 11A and 11B are sectional views of a liquid cutoff valve unit having the structure of FIG. 10 for the explanatory of the change of the liquid level according to float valve closing operation due to the change of an fuel supply speed.
Figure 11B:
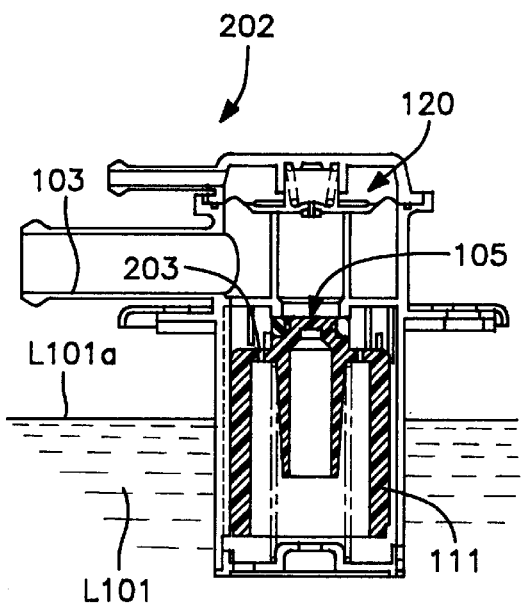

The diaphragm valve 10 is opened in response to the pressure difference from the inside pressure of the fuel tank 101, so that a pressure approximately corresponding to the atmospheric pressure (or negative pressure) is introduced into a working chamber R1, and a filler port 106 is provided for the working chamber R1 so as to communicate the filler port 106 with a filler tube 107 (fuel supply portion) through a filler line 108 as shown in FIG. 7.

In an occasion that the pressure difference between the inner pressure of the fuel tank 101 and that of the working chamber R1 is small, the diaphragm 10a is urged in the valve-closing direction by the spring 13 and the valve seat portion 9 is closed, and in a time when the pressure difference becomes large more than a predetermined one through, for example, fuel supply, it is opened to thereby discharge the fuel steam G into the discharge line 103 through the discharge port 11.

Furthermore, the diaphragm valve 10 is provided with an orifice 12 performing the fine communication between the inside of the fuel tank 101 and the inside of the working chamber R1, enabling to finely discharge the fuel L flowing into the working chamber side into the fuel tank side.

The reason why the working chamber does not take a release state at which the atmospheric pressure can be introduced resides in that the fuel steam G passing through the orifice and a pressure film of the diaphragm valve 10 is not directly discharged into the atmosphere, because, in a case of the pressure film being a thin film formed of a rubber-like elastic material, the fuel steam G may pass the pressure film. Further, the fuel supply port formed to the opened end of the filler tube 107 is usually closed by a cap and the fuel is not discharged, at the supply time, because of the venturi effect of the fuel L.

The liquid cutoff valve unit 1 according to this embodiment will be described hereunder.

In the state of FIG. 1A, in which the float 3 is positioned to a lower portion without receiving no buoyancy of the fuel L and the float valve 3 is hence opened. When the inner pressure of the fuel tank 101 is increased at a time of the fuel supply, for example, the fuel steam G passes the opened window section 2b opened to the upper portion of the float chamber 2a and then flows into the vent portion through the valve seat portion 7. Thereafter, the fuel steam G passes the diaphragm valve 10, which is now opened because of the pressure difference, and is discharged to the discharge line 103.

Further, the float 3 is not designed so as to utilize the air, as buoyancy, stored in the air reservoir 3b formed in the inner cylindrical portion of the float 3, and accordingly, even if a roll-over test be carried out for observing and evaluating whether the function of the liquid cutoff valve unit 1 can be maintained at a roll-over time of a vehicle such as shown in FIGS. 9A–9E the urging force of the float 3 in the valve opening direction is less changed and the valve is not opened, thereby preventing a large amount of fuel leaking from causing. Furthermore, in order to suppress the change of the buoyancy caused by the air stored inside the cylindrical spring guide 3c disposed at the central portion of the air reservoir 3b, it may be possible to close or seal the inner cylindrical portion or fill up with a floating member.

Concerning the change of the full filling amount at the fuel supply time due to the change of the closed position of the float valve with respect to the change of the oil supply speed, which has been provided as one problem of the conventional structure, the change of the full filling amount can be reduced by operating the liquid cutoff valve unit 1 in the following manner.

Figure 2A:
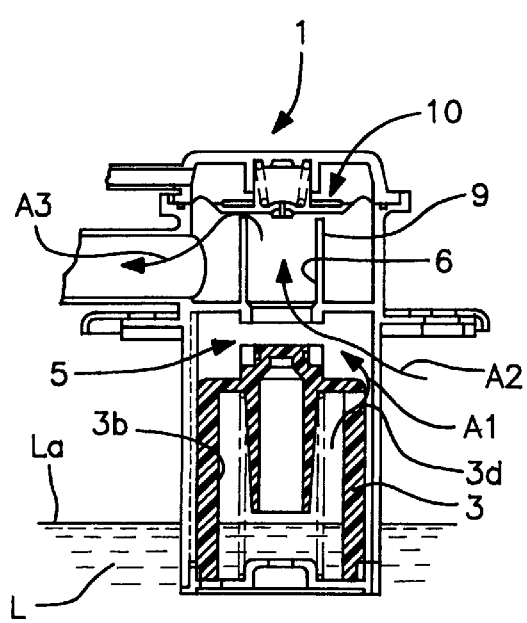
FIGS. 2A and 2B are views showing a state in which the liquid cutoff valve unit of FIG. 1 performs an fuel supply at a low speed.
Figure 2B:
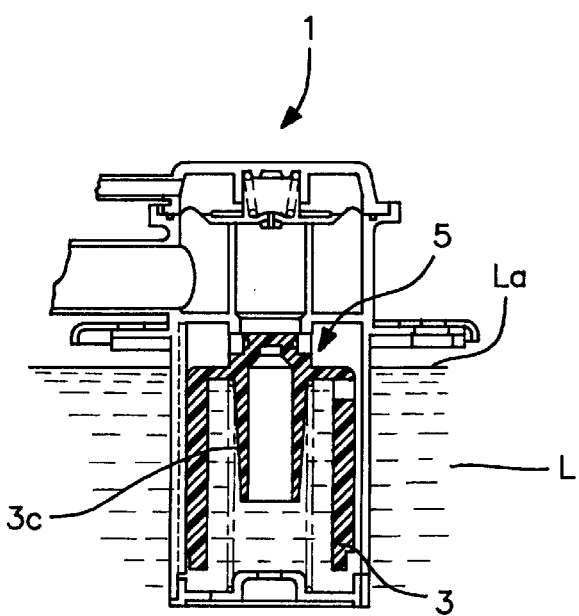

Referring to FIGS. 2A and 2B showing the operating state of the liquid cutoff valve unit 1 at a time of the low speed oil supply, in which FIG. 2A shows the state that the liquid level La rises to the ⅓ position in the entire length of the float from the lower side thereof and FIG. 2B shows the state that the float 3 floats and the float valve 5 is closed.

At a time of the low fuel supply speed, i.e. low liquid level rising speed, since the air stored in the air reservoir 3b is gradually vented through the communication port 3d as shown with arrow A1, the buoyancy due to the air in the reservoir 3b does not act on the float 3. The air in the fuel tank 101 flows, as shown with arrow A2, into the vent portion 6 through the float valve 5 now being opened and is then discharged into the discharge line 103 through the diaphragm valve 10 now opened by the pressure difference.

When the fuel supply is continued, the liquid level La rises gradually and the float valve 5 is moved in the valve closing direction to close the same by the buoyancy corresponding to the volume of the float itself and the urging force of the spring 8. That is, in the valve closing state of FIG. 2B, since the fuel L is flowed in the air reservoir 3b and no air hence exists, the buoyancy of the air is not generated.

On the other hand, in the case of the high fuel supply speed, i.e. high liquid level rising speed, a large amounts of the fuel steam G and air are generated and the liquid surface is waved, so that the amount of the air existing in the air reservoir 3b and the amount of the introduced air exceeds the amount of the air breathing through the communication port 3d, giving the buoyancy to the float valve, and accordingly, the float valve 5 may be closed at the liquid level lower than that at the low fuel supply speed time.

Figure 3A:
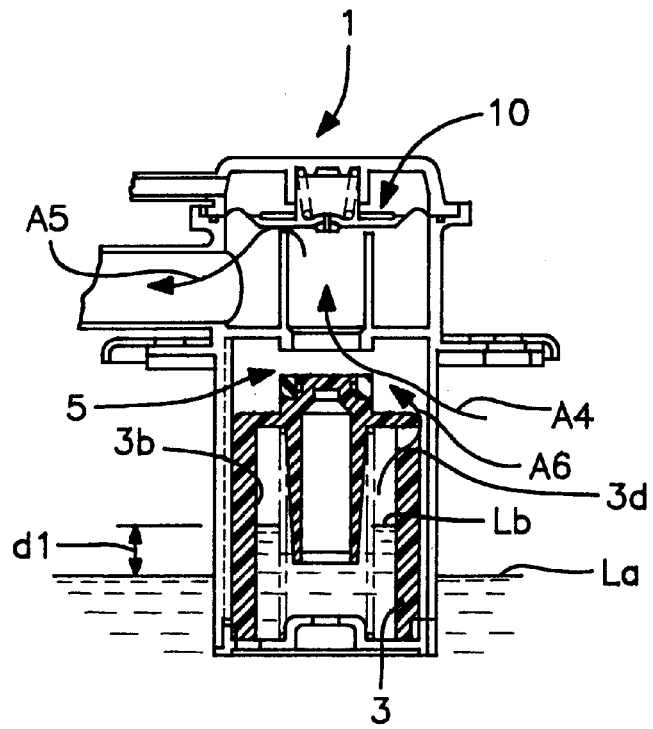
FIGS. 3A and 3B are views showing a state in which the liquid cutoff valve unit of FIG. 1 performs an fuel supply at a high speed.

In the state shown in FIG. 3A in which the float valve 5 is opened at the high oil supply speed, the air flows into the float chamber 2a through the opened window section 2b opposing to the communication port 3d, then flows from the float valve 5, now opened state, to the diaphragm valve 10, now also opened by the pressure difference, through the vent portion 6, and finally, flow into the discharge line 103 (in directions A4, A5).

In this operation, the air in the air reservoir 3b is sucked and discharged from the communication port 3d in the direction A6 by the velocity of the air flowing into the float chamber 2a from the opened window section 2b (due to negative pressure phenomenon caused by the velocity of the air). Accordingly, the buoyancy due to the air in the air reservoir 3b is lowered and it is hard to open the float valve 5, and as a result, the liquid level for closing the float valve 5 at the time of the high fuel supply speed is raised so as to be close to the liquid level for closing the float valve 5 at the time of the low fuel supply speed.

That is, as shown in FIG. 3A, the air in the air reservoir 3b is sucked by the flow velocity of the air flowing into the float chamber 2a in the direction A4 to thereby reduce the inner pressure of the air reservoir 3b. According to such phenomenon, the liquid level Lb in the air reservoir 3b becomes higher, by an amount of d1, than the liquid level La in the fuel tank 101 through the fuel supply, and the weight of the fuel corresponding to the height d1 is added to the weight of the float 3, causing a state not to easily close the valve.

Figure 3B:
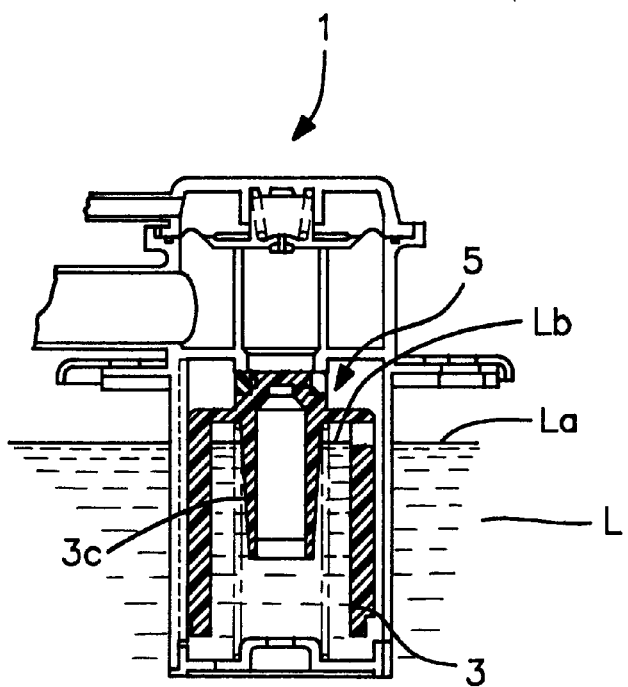

FIG. 3B shows the state that the liquid level La rises and the float valve 5 is hence closed. When the float valve 5 takes a position to be nearly closed, the valve opened degree is decreased, and the air flow amount and the air velocity, in the direction A4, are also decreased, thus making small the negative pressure to be generated. However, after the increasing of the liquid level Lb in the air reservoir 3b to the height of the communication port 3d, the fuel L will flow through the communication port 3d even if the negative pressure be maintained, and hence, the float valve is closed with the weight reduced condition of the fuel L loaded to the float 3, thus realizing the stable valve closing operation.

The smooth fine (minute) communication between the inner spaces of the air reservoir 3b and the fuel tank 101 will be established by the presence of the opposing communication port 3d and the opened window section 2b, whereby the liquid level Lb inside the air reservoir 3b can properly changes in accordance with the waved liquid level caused by the fuel supply and the increasing and decreasing of the buoyancy caused by the air in the air reservoir 3b can be also reduced, thus stabling the behavior of the float 3.

Figure 4:
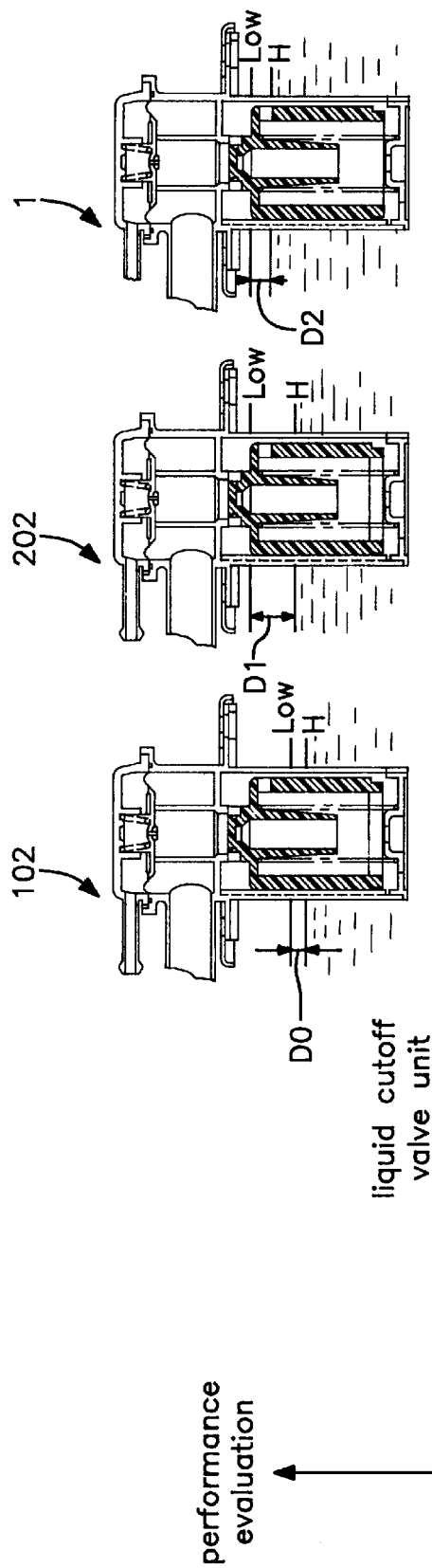
FIG. 4 is a view showing a liquid level of a conventional cutoff valve unit and that of the first embodiment of the present invention and also showing a table showing valve closing characteristics at roll-over tests.

FIG. 4 includes views showing the liquid levels of the float valve 5 at which it is closed at the high and low fuel supply speeds in the conventional liquid cutoff valve units 102 and 202 and the liquid cutoff valve unit 1 of the first embodiment of the present invention and also includes a Table showing the difference (deviation) of the liquid levels for closing the float valve due to the valve closing characteristics and the fuel supply speeds at the time when the roll-over test was carried out.

With reference to FIG. 4, the letter "H" denotes the liquid level at the high fuel supply speed and the term "LOW" denotes the liquid level at the low fuel supply speed. With the liquid cutoff valve unit 202, the valve closing characteristics could be improved at the roll-over test by providing a small-diametered communication port 203, to the upper portion of the float 111, for breathing the air, but in such case, the difference in the liquid levels (distance D1 in FIG. 4) for closing the float valve in accordance with the fuel supply speeds was made large.

However, with the liquid cutoff valve unit 1 according to the first embodiment of the present invention, an improved valve closing characteristics at the time of the roll-over test could be realized, and moreover, the difference in the liquid levels (distance D2 in FIG. 4) for closing the float valve in accordance with the fuel supply speeds could be preferably suppressed.

Second Embodiment

Figure 5:
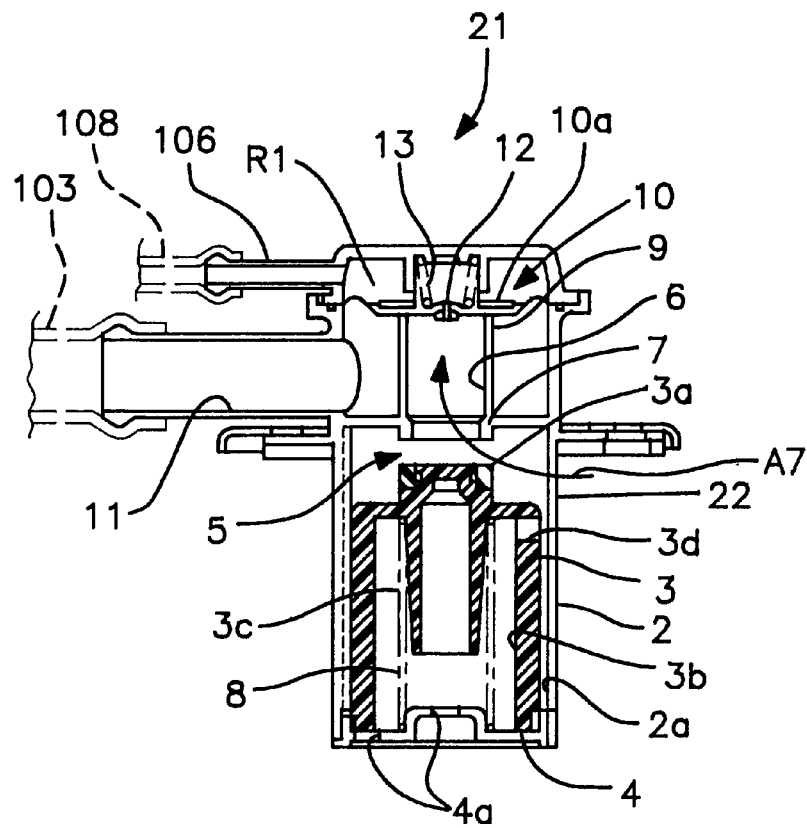
FIG. 5 is a sectional view of a liquid cutoff valve unit according to a second embodiment of the present invention.

FIG. 5 shows a sectional view of the liquid cutoff valve unit 21 according to the second embodiment of the present invention, which differs from that of the first embodiment in that the communication port 3d is positioned below the opened window section 22 in the state of no buoyancy to the float valve 5. In an actual structure of the liquid cutoff valve unit 21, the lower edge portion of the opened window section 22 is designed so as to be higher than that of the liquid cutoff valve unit 1.

According to this structure of the second embodiment, in the state that the float valve 5 of the liquid cutoff valve unit 21 is disposed to a lower position, almost all the air flowing from the opened window section 22 of the float chamber 2a flows from the opened float valve 5 towards the vent portion in the direction A7, so that any circulation flow passing through the communication port 3d of the float 3 and returning to the fuel tank is substantially not caused, thus performing an effective discharging.

When the float valve 5 floats according to the rising of the liquid level, the communication port 3d and the opened window section 22 take opposed positional relationship. Accordingly, the air in the air reservoir 3b is sucked and discharged, as like as a case of FIG. 3A, and the buoyancy due to the air existing in the air reservoir 3b is lowered and the float valve 5 is hard to be opened. As a result, in this embodiment, the liquid level for closing the float valve 5 is raised to be close to a liquid level suitable for closing the float valve 5 at the time of the low fuel supply speed.

At the same time, since the fine communication of the air between the inner spaces of the air reservoir 3b and the fuel tank 101 can be smoothly established, whereby the liquid level Lb inside the air reservoir 3b can properly changes in accordance with the waved liquid level caused by the fuel supply and the increasing and decreasing of the buoyancy caused by the air in the air reservoir 3b can be also reduced, thus stabilizing the behavior of the float 3.

Figure 6:
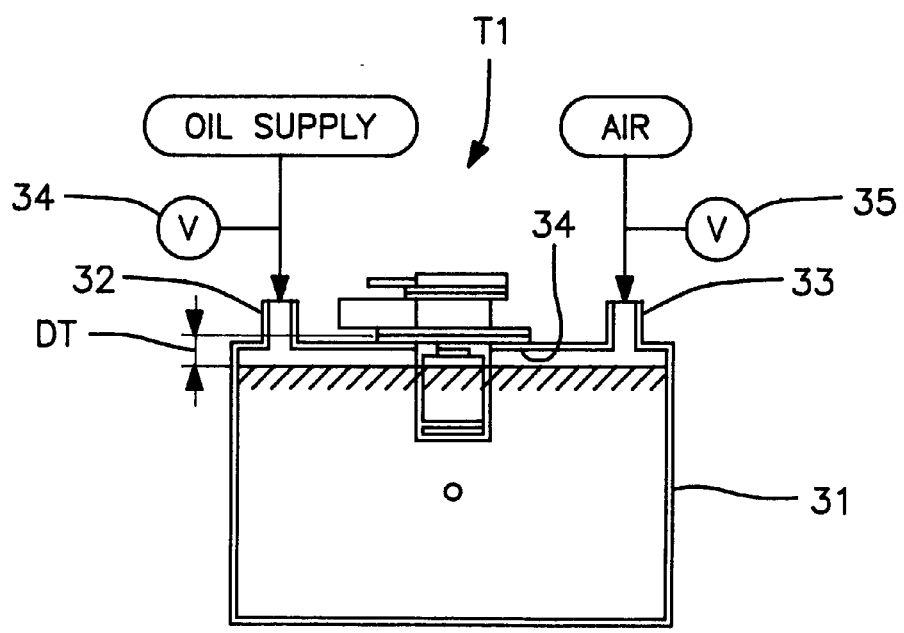
FIG. 6 is an illustration showing a testing device.

In order to confirm the improved functions and effects of the liquid cutoff valve unit according to the second embodiment of the present invention, changes in the fuel supply amounts due to the fuel supply speed (liquid level height at the time of the float valve being closed) were measured by utilizing a testing (test) device T1 shown in FIG. 6.

There was used the testing device T1 comprising a sealing vessel 31, having substantially the same volume as that of the fuel tank to be actually used, an fuel supply port 32, an air supply port 33 which are formed to the upper portions of the vessel 31, an air supply port 33 and a mounting hole 34 to which the liquid cutoff valve unit is detachably mounted.

The fuel is supplied to the fuel supply port 32 from a fuel pump, not shown, and regulated in amount to a predetermined rate by an fuel flow rate regulating valve 34, and in the like manner, the air is supplied to the air supply port 33 from an air supply source, not shown, and regulated in amount to a predetermined rate by an air flow rate regulating valve 35.

In order to confirm the advantageous effects and functions of the present invention, the changes in fuel supply amounts due to the fuel supply speeds of the conventional liquid cutoff valve unit 202 and that 1 of the present invention were compared.

That is, by using the testing devices T1 to which the conventional liquid cutoff valve unit and that of the present invention were mounted, the liquid rising speeds and the air flow rates were set to the same predetermined amounts in both the testing devices T1 and the liquid levels DT at which the float valves are closed were measured (these liquid levels were called lock points). Further, the liquid levels DT were distances each between the upper end portion of the valve body of the float valve and the liquid surface level, these liquid levels having been compared with each other.

The conditions as to the liquid rising speeds and the air flow rates are shown in the following Table 1, in which the liquid rising speeds and the air flow rates were set to 4 mm/sec and to 40 l/min at the reference fuel speed time, set to 1 mm/sec and to 15 l/min at the low fuel supply speed time and set to 5 mm/sec and to 70 l/min at the high fuel supply speed time, respectively.

TABLE 1

| | Conditions | |
|---|---|---|
| Oil Supply Speed | Liquid Level Rising Speed (mm/sec) | Air Flow Rate (l/min) |
| Reference Supply | 4 | 40 |
| Low Supply Speed | 1 | 15 |
| High Supply Speed | 5 | 70 |

The measured results are shown in the following Table 2. From the Table 2, it will be found that, according to the conventional liquid cutoff valve unit 202, the width between the low and high fuel supply speed times was 6.65 mm in range at the lock points, but according to the liquid cutoff valve unit 1 of the present invention, the width therebetween was 5.25 mm, thus conforming the width reduction of 1.4 mm. This fact was resulted from the reduction by 21% of the range at the lock point of the conventional liquid cutoff valve unit 202, thus confirming the advantageous effects of the present invention.

TABLE 2

| | Lock Point Position (DT) (mm) | | |
|---|---|---|---|
| Oil Supply Speed | U202 *1 | U1 *2 | Difference |
| Reference Supply Speed | 20.8 | 20.5 | 0.3 |
| Low Supply Speed (A) | 17.85 | 17.75 | 0.1 |
| High Supply Speed (B) | 24.5 | 23.0 | 1.5 |
| Lock Point Range R: \|(A)-(B)\| | 6.65 | 5.25 | 1.4 (21% Down) |

(U202: conventional liquid cutoff valve unit 202 and U1: liquid cutoff valve unit 1 of the present invention) (*1:n=10 *2:n=2, averaging data)

As mentioned above, according to the liquid cutoff valve units of the present invention, the stable valve closing characteristics can be maintained even in the roll-over time of a vehicle, for example, and the fuel leaking can be effectively prevented. Moreover, the change of the liquid level, due to the change of the fuel supply speed, at which the float valve is closed, can be preferably reduced and the changes of the fuel supply amount (change of the full filling amount due to the automatic stop of an fuel gun, for example) can also be reduced.

Furthermore, since the fine air communication can be established between the inner spaces of the air reservoir and the fuel tank, the increasing or decreasing the buoyancy due to the air existing in the air reservoir can also be reduced, so that smooth valve opening/closing operation can be realized.

Still furthermore, according to the structure in which the communication port of the float valve is positioned lower than that of the opened window section, the lowering of the air discharge amount from the float valve now opened can be effectively prevented.

It is to be noted that the present invention is not limited to the described embodiment and many other changes and modifications may be made without departing from the scopes of the appended claims.

What is claimed is:

1. A liquid cutoff valve unit provided for a sealed container in which a liquid fills, comprising:

a discharge passage formed in an upper portion of the sealed container in a used state and adapted to discharge the liquid therein;

a float valve moving in accordance with a buoyancy so as to open or close the discharge passage;

a float chamber in which the float valve is accommodated and having a size enabling the float valve to be moved therein, said float valve being provided with an air reservoir and provided with an upper side wall section having a communication port communicating the air reservoir with an outside of the float chamber; and a spring member for urging the float valve in a valve closing direction, wherein said float valve is provided with a cylindrical member having an upper end closed and a lower end opened and at least one communication port opened in an upper side wall section of the cylindrical member and adapted to establish the communication between an inside and an outside of the air reservoir, said float chamber being provided with at least one opened communication port window section formed in a side wall section thereof in association with the communication port of the float valve so that a gas in the sealed container finely passes through the opened window section in a manner that when the float valve takes a lower position and no buoyancy acts thereof, the communication port of the float valve is located at a position lower than the location of the opened window section and, when the buoyancy acts thereon the float valve is raised, the communication portion takes a position opposing to the location of the opened window section, and the gas is introduced into the air reservoir or discharged therefrom in accordance with a level of the liquid in the sealed container.

2. A liquid cutoff valve unit according to claim 1, wherein said communication port has a width substantially equal to that of said opened window section.

3. A liquid cutoff valve unit according to claim 1, wherein a plurality of communication ports are formed and a plurality of opened window sections are formed so as to correspond to the communication ports in numbers and positions.

* * * * *